(12) United States Patent
Salter et al.

(10) Patent No.: US 11,619,440 B2
(45) Date of Patent: Apr. 4, 2023

(54) VEHICLE REFRIGERATED COMPARTMENT AND METHOD OF CONTROLLING

(71) Applicant: Ford Global Technologies, LLC, Dearborn, MI (US)

(72) Inventors: Stuart C. Salter, White Lake, MI (US); Zeljko Deljevic, Plymouth, MI (US); Stephen Neal Jacobsen, Plymouth, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 142 days.

(21) Appl. No.: 17/202,502

(22) Filed: Mar. 16, 2021

(65) Prior Publication Data

US 2022/0299261 A1 Sep. 22, 2022

(51) Int. Cl.
*F25D 29/00* (2006.01)
*B60N 3/10* (2006.01)
*B60W 10/26* (2006.01)
*B60W 10/30* (2006.01)

(52) U.S. Cl.
CPC ........... *F25D 29/003* (2013.01); *B60N 3/104* (2013.01); *B60W 10/26* (2013.01); *B60W 10/30* (2013.01); *F25D 2400/12* (2013.01); *F25D 2700/02* (2013.01); *F25D 2700/06* (2013.01); *F25D 2700/14* (2013.01)

(58) Field of Classification Search
CPC .. B60H 1/3205; B60H 1/3219; F25B 2700/15
See application file for complete search history.

(56) References Cited

U.S. PATENT DOCUMENTS

| 6,829,943 | B2 * | 12/2004 | Weyand | ............... G01G 19/086 |
| | | | | 73/862.53 |
| 7,082,773 | B2 | 8/2006 | Cauchy | |
| 9,451,723 | B2 * | 9/2016 | Lofy | .................. H05K 7/20845 |
| 10,562,377 | B2 | 2/2020 | Vehr et al. | |
| 2017/0154482 | A1 * | 6/2017 | Osborne | ............ G07C 9/00309 |
| 2018/0001740 | A1 * | 1/2018 | Vehr | .................... B60H 1/3205 |
| 2018/0001744 | A1 * | 1/2018 | Vehr | ..................... B60H 1/005 |
| 2018/0100682 | A1 | 4/2018 | Nilsen et al. | |
| 2019/0337354 | A1 | 11/2019 | Vadlamani et al. | |
| 2020/0059769 | A1 * | 2/2020 | Macneille | ................ H01Q 3/38 |
| 2020/0139871 | A1 | 5/2020 | Urbina Valencia et al. | |

FOREIGN PATENT DOCUMENTS

CN 105115108 A 12/2015

\* cited by examiner

*Primary Examiner* — Jianying C Atkisson
*Assistant Examiner* — Meraj A Shaikh
(74) *Attorney, Agent, or Firm* — Vichit Chea; Price Heneveld LLP

(57) ABSTRACT

A vehicle including a refrigerated compartment having a chamber and a cooling system for cooling the chamber and methods of controlling the cooling system is provided. The vehicle includes a controller that controls a supply of power from a battery of the vehicle to the cooling system based on at least one output signal received from a vehicle component.

19 Claims, 9 Drawing Sheets

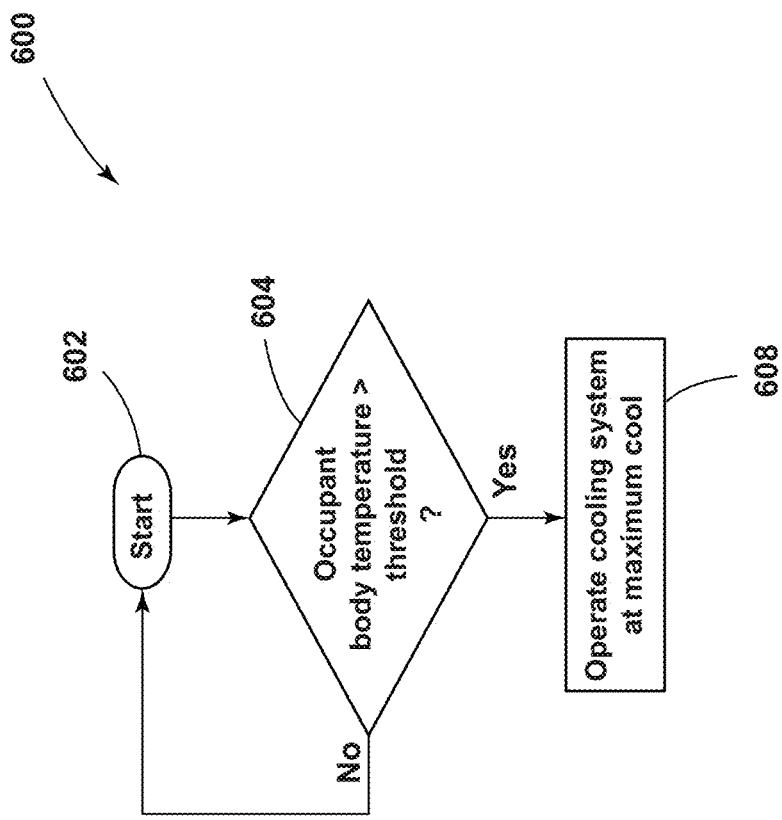

VEHICLE REFRIGERATED COMPARTMENT AND METHOD OF CONTROLLING

FIELD OF THE DISCLOSURE

The present disclosure generally relates to a refrigerated compartment for a vehicle and methods for controlling said refrigerated compartment.

BACKGROUND OF THE DISCLOSURE

Some consumers may desire the option to have a refrigerated compartment, such as a cooler, in the vehicle that can be used to cool beverages, food items, medicine, and/or other perishable items. There is a general desire for systems and methods of operating a refrigerated compartment in a vehicle.

SUMMARY OF THE DISCLOSURE

According to at least one aspect of the present disclosure, a vehicle includes a vehicle motor, a vehicle battery system, a refrigerated compartment comprising a chamber having an access opening, a door coupled with the refrigerated compartment and moveable between open and closed positions relative to the access opening, and a cooling system fluidly coupled with the chamber. The vehicle also includes a controller that controls a supply of power from the vehicle battery system to the cooling system based on at least one output signal received from a vehicle component.

According to another aspect of the present disclosure, a vehicle includes a vehicle motor, a vehicle battery system, a refrigerated compartment comprising a chamber having an access opening, a door coupled with the refrigerated compartment and moveable between open and closed positions relative to the access opening, and a door sensor that provides an output signal when the door is moved between the open and closed positions, a cooling system fluidly coupled with the chamber. The vehicle includes a controller communicably coupled with the door sensor, wherein the controller controls a supply of power from the vehicle battery system to the cooling system based on the output signal received from the door sensor.

According to another aspect of the present disclosure, a method of controlling a refrigerated compartment in a vehicle is provided. The method includes supplying power from a vehicle battery system of the vehicle to a cooling system of the refrigerated compartment, cooling a storage chamber of the refrigerated compartment with the cooling system, receiving, by a controller of the vehicle, at least one output signal from at least one vehicle component, and controlling the supply of power from the vehicle battery system to the cooling system based on the at least one output signal received by the controller.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 8 is a flow chart illustrating a method of controlling a supply of power to a cooling system of a refrigerated compartment in a vehicle based on a temperature of an occupant of the vehicle, according to aspects of the present disclosure.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
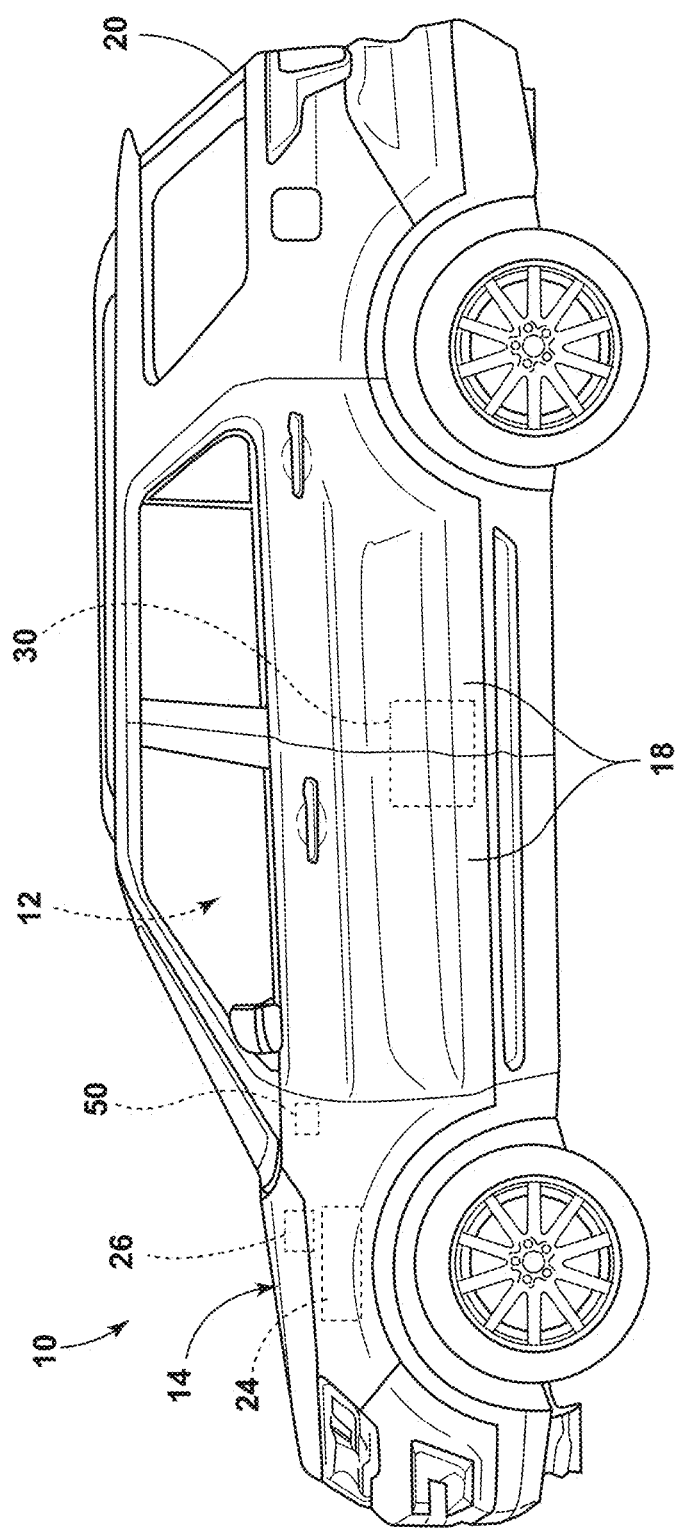
FIG. 1 is a side view of a vehicle having a refrigerated compartment, according to aspects of the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Embodiments of the present disclosure relate to a refrigerated compartment within a vehicle that can be controlled to cool items placed therein by occupants of the vehicle. The refrigerated compartment of the vehicle can be controlled based on an output signal received by a controller of the vehicle from one or more components of the vehicle. In some embodiments, the vehicle component is a component that is located exterior of the refrigerated compartment and/or is not directly associated with the refrigerated compartment.

Figure 2:
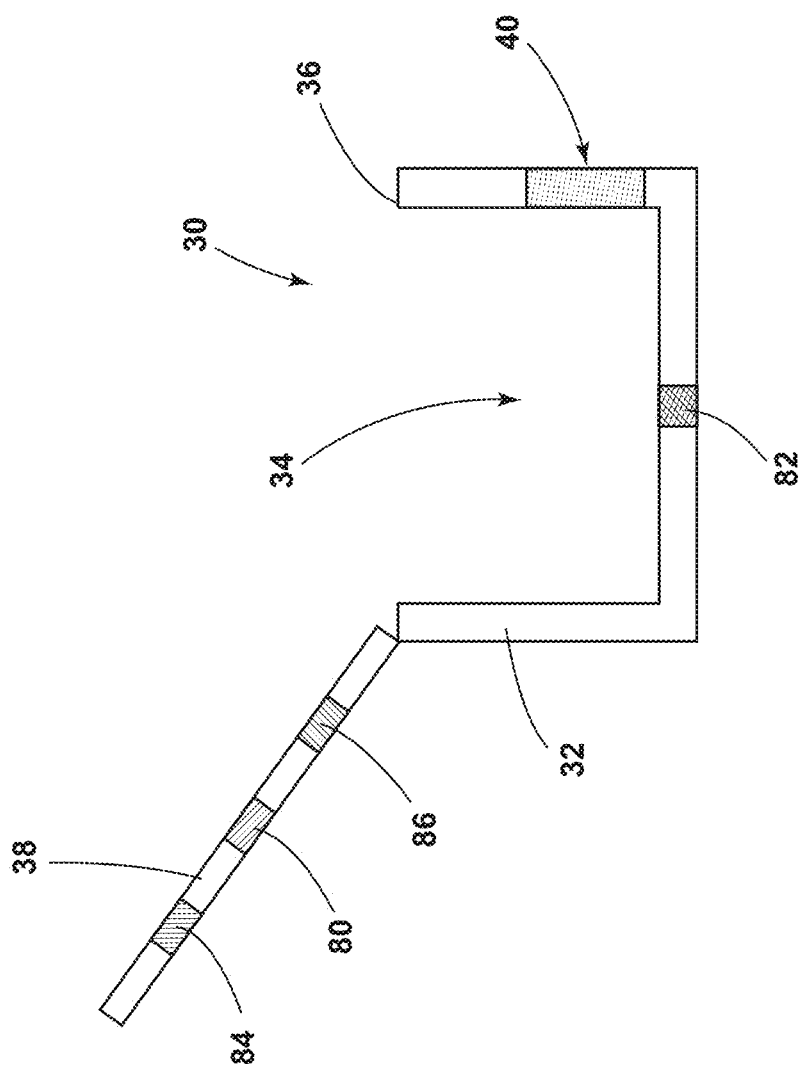
FIG. 2 is a schematic view of a refrigerated compartment for use in a vehicle, according to aspects of the present disclosure.
Figure 3:
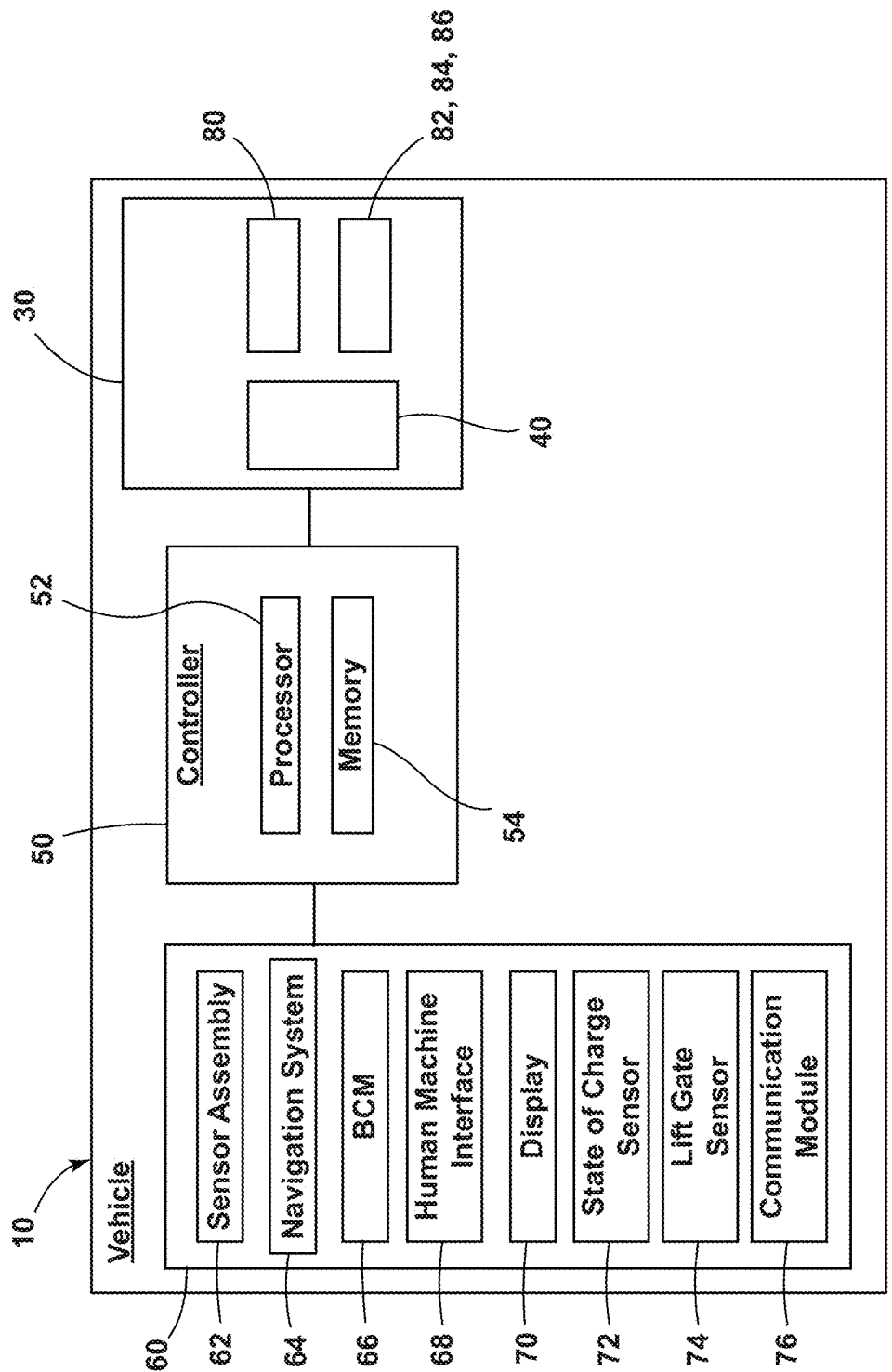
FIG. 3 is a block diagram of a vehicle incorporating a refrigerated compartment, according to aspects of the present disclosure.

Referring to FIGS. 1-3, a vehicle 10 includes an interior 12 and a body 14 that separates the interior 12 from the external environment. The vehicle 10 can be any type of passenger vehicle, non-limiting examples of which include a car, a truck, a sport utility vehicle, a crossover utility vehicle, and a recreational vehicle. The vehicle 10 includes one or more occupant doors 18 by which occupants can enter and exit the interior 12. The vehicle 10 also includes a lift gate 20 that can be opened and closed to provide access to a rear area of the vehicle 10. While the lift gate 20 is illustrated as a rear door that pivots open and closed about a horizontal hinge axis, the lift gate 20 can be any type of rear door that provides access to a rear area of the vehicle 10, non-limiting examples of which include a trunk, a split lift gate, a tail gate, and split doors that rotate about a vertical hinge axis.

The vehicle 10 is powered by a vehicle motor 24 that may be an internal combustion engine, an electric motor, or a combination of both an internal combustion engine and an electric motor (e.g., a hybrid electric vehicle). The vehicle 10 can include a vehicle battery system 26 that includes one or more batteries for supplying electric power to one or more components of the vehicle 10.

Referring now to FIG. 2, the vehicle 10 includes a refrigerated compartment 30 for selectively cooling items stored therein. The refrigerated compartment 30 includes a housing 32, a chamber 34 defining a space within which items can be placed for cooling, and an access opening 36 providing access to the chamber 34. The refrigerated compartment 30 includes a door 38 that is moveable between open and closed positions relative to the access opening 36. The door 38 may be moveable between open and closed positions about a horizontal or vertical hinge axis, depending on the design of the refrigerated compartment 30. In some embodiments, the door 38 may be configured as a sliding door. The refrigerated compartment 30 includes a cooling system 40 that can be operated to cool items stored within the chamber 34. The cooling system 40 can be any suitable type of cooling system. In one embodiment, the cooling system 40 is a compressor-based cooling system that utilizes a compressor, condenser, and evaporator set-up to provide cool air to the chamber 34. In some embodiments, the housing 32 is integrally formed with a component of the vehicle 10, such as a vehicle console. In some embodiments, the housing 32 is separable from the vehicle component such that the refrigerated compartment 30 may be moved and used outside of the vehicle 10. In another embodiment, the refrigerated compartment 30 can be permanently or removably disposed within a rear storage compartment, trunk, or truck bed of the vehicle 10.

Referring again to FIGS. 1-3, the vehicle 10 includes a controller 50 having a processor 52 and a memory 54. The processor 52 can be any suitable processing device or set of processing devices, non-limiting examples of which include a microprocessor, a micro-controller-based platform, an integrated circuit, a field programmable gate array, a tensor processing unit, and an application-specific integrated circuit. The memory 54 can include one or more forms of computer-readable media that contain computer-executable instructions executable by the processor 52 for performing various operations. The computer-executable instructions may embody one or more of the methods or control logic according to the embodiments of the present disclosure. The memory 54 can include one or more kinds of memory, non-limiting examples of which include volatile memory (e.g., RAM), non-volatile memory (e.g., disk memory, FLASH memory, EPROMs, EEPROMs, non-volatile solid-state memory), unalterable memory (e.g., EPROMs), read-only memory, and high-capacity storage devices (e.g., hard drives, solid-state drives).

The controller 50 may communicate with various vehicle components 60 to receive an output signal from the vehicle components 60 and/or send an input signal to the vehicle components 60 (See FIG. 3). The vehicle components 60 can include a sensor assembly 62, a navigation system 64, a body control module (BCM) 66, a human machine interface (HMI) 68, a display 70, a vehicle battery state of charge sensor 72, a lift gate sensor 74, and a communication module 76. One or more of the sensor assembly 62, navigation system 64, body control module (BCM) 66, human machine interface 68, vehicle battery state of charge sensor 72, lift gate sensor 74, and/or communication module 76 may provide an output signal to the controller 50 that is used by the controller 50 to control the operation of the refrigerated compartment 30 according to embodiments of the present disclosure. In some embodiments, the controller 50 controls the operation of the refrigerated compartment 30 by controlling a supply of power to the cooling system 40 of the refrigerated compartment 30 based at least in part from an output signal received from any one or more of the vehicle components 62, 64, 66, 68, 72, 74, and/or 76.

The controller 50 may also communicate with components of the refrigerated compartment 30 to receive an output signal from the refrigerated compartment components and/or send an input signal to the refrigerated compartment components. In some embodiments, the refrigerated compartment 30 includes a door sensor 80 associated with the door 38 of the refrigerated compartment 30. The door sensor 80 can provide an output signal indicative of the door 38 being moved between a closed position and an open position. In some embodiments, the controller 50 can receive the output signal from the door sensor 80 and control the operation of the refrigerated compartment 30 based at least in part on the output signal from the door sensor 80 indicative of an open or closed status of the door 38. The refrigerated compartment 30 can optionally include one or more additional refrigerated compartment components that may provide an output signal to the controller 50 that is used by the controller 50 to control the operation of the refrigerated compartment 30 according to embodiments of the present disclosure. For example, the refrigerated compartment 30 can include a weight sensor 82 associated with the chamber 34 that provides an output signal indicative of a weight of an item(s) placed within the chamber 34. The output signal indicative of a weight of an item(s) placed within the chamber 34 may be used by the controller 50 to determine a weight value of the item(s) and/or to determine that the weight satisfies a predetermined threshold. In one example, the weight sensor 82 can be a load cell transducer. In another example, the refrigerated compartment 30 can include a temperature sensor 84, such as an infrared temperature sensor, that outputs a signal indicative of a temperature of the contents of the refrigerated compartment 30. In another example, the refrigerated compartment 30 can include a proximity sensor 86, such as an integrated infrared emitter proximity sensor. The proximity sensor 86 can detect the presence of an item within the chamber 34 and provide an output signal to the controller 50 based on detecting the presence of an item. Each of the door sensor 80, weight sensor 82, temperature sensor 84, and/or proximity sensor 86 can be coupled with the controller 50 through a wired connection or through a wireless connection, such as a Bluetooth® module that supports a Bluetooth® Low Energy (BLE) protocol or other Bluetooth® protocol.

The sensor assembly 62 can include any one or a number of optional sensors that may be present in the vehicle 10. In some embodiments, the sensor assembly 62 may include one or more temperature sensors that determine the temperature of an environment and/or occupant within the interior 12 of the vehicle 10. For example, the sensor assembly 62 can include one or more temperature sensors that can determine a body temperature of one or more occupants of the vehicle, such as an infrared camera, for example. In this example, the sensor assembly 62 may provide an output signal to the controller 50 indicative of a value of a body temperature of one or more occupants or indicative of a body temperature of one or more occupants satisfying a predetermined threshold. The controller 50 may use the output signal relating to occupant body temperature to control the refrigerated compartment 30 and/or additional systems of the vehicle 10 (e.g., the vehicle HVAC system). For example, if the output signal from the sensor assembly 62 indicates that the body temperature of one or more occupants is above a predetermined threshold, the controller 50 may actuate the cooling system 40 of the refrigerated compartment to a maximum cool setting.

In another example, the sensor assembly 62 may include a temperature sensor that determines an interior ambient temperature of the interior 12 of the vehicle 10 and provides an output signal to the controller 50 based on the determined interior ambient temperature. The output signal may be indicate of the value of the interior ambient temperature or indicative of the interior ambient temperature satisfying a predetermined threshold. For example, when the interior ambient temperature is below a first predetermined threshold (e.g., about 40° F. (about 4° C.)), the controller 50 can stop/prevent power being supplied to the cooling system 40 until the interior ambient temperature is above a second predetermined threshold (e.g., about 60° F. (about 15° C.)). Such a control algorithm can address the situation in which an occupant enters the vehicle 10 when it has been left sitting overnight in cool weather, in which case it may be assumed that the contents of the refrigerated compartment 30 are cold. Not supplying power to the cooling system 40 in this situation (until the second predetermined threshold is satisfied) can provide a power saving feature. In another example, when the interior ambient temperature is above a third predetermined threshold (e.g., about 77° F. (about 25° C.), the controller 50 can control the cooling system 40 to a maximum cooling setting when the vehicle motor 24 is engaged. In this example, it may be assumed that when the interior ambient temperature is above the third predetermined threshold, occupants will want the contents of the refrigerated compartment 30 (e.g., drinks) to be cool. Operating the cooling system 40 at a maximum cool setting may allow the contents to cool quicker and/or remain cool for longer when power to the cooling system is stopped (e.g., when the vehicle motor 24 is stopped).

The navigation system 64 can include a global positioning system (GPS) that communicates location and/or drive route information to the controller 50. For example, the navigation system 64 can provide information to the controller 50 regarding the location of the vehicle 10 and/or information related to the progress of a trip (e.g., estimated time of arrival, distance to destination, distance from home, etc.). A user may interact with the navigation system 64 through the HMI 68 and/or through a remote user interface (e.g., user's mobile device, tablet, smart phone, smart watch, etc.). In some examples, navigation information (e.g., drive route) may be inferred based on historical data accumulated from prior drive routes. The historical data may be saved in a memory associated with the navigation system 64 and/or within the memory 54 of the controller 50. The navigation system 64 and/or controller 50 may communicate over a cloud database (i.e., the Internet) to obtain various information stored on one or more servers through any suitable type of communication, non-limiting examples of which include cellular signals, Wi-Fi, Bluetooth®, etc.

The BCM 66 controls various subsystems of the vehicle 10 and can provide the controller 50 with information relating to the vehicle 10 and components of the vehicle 10. For example, the BCM 66 may control power windows, power locks, and/or power mirrors, etc. . . . of the vehicle 10. The BCM 66 is coupled to circuits to, for example, drive relays and/or smart drivers (e.g., to control the power supply to the cooling system 40 of the refrigerated compartment 30), drive brushed direct current (DC) motors (e.g., to control power seats, power locks, power windows, wipers, etc.), drive stepper motors, and/or drive LEDs, etc. For example, the BCM 66 can provide the controller 50 with an output signal relating to the vehicle door status (e.g., locked or unlocked), vehicle speed, vehicle engine status, etc. According to one embodiment, the BCM 66 is coupled with a relay or smart driver that allows current to be drawn by the cooling system 40, thus providing the cooling system 40 with power to operate to cool the chamber 34 of the refrigerated compartment 30. The BCM 66 can provide an output signal to the controller 50 indicative of the amount of current drawn by the cooling system 40 and/or an elapsed period of time that the cooling system 40 has been drawing a current. In some embodiments, the controller 50 can use the length of time the cooling system 40 is drawing power to control the supply of power to the cooling system 40.

The HMI 68 can be used to receive input from a user to control one or more functions of the vehicle 10 and/or to provide an output to communicate information with a user. The HMI 68 can include any combination of touch screens, displays, buttons, knobs, and controllers. The HMI 68 may communicate with a user visually (e.g., text, images, graphics, icons, etc.) and/or audibly (e.g., voice commands, audible signals, etc.). The display 70 may form a part of the HMI 68 and/or may be a separate component. For example, the HMI 68 can communicate with a user regarding heating/cooling settings within the vehicle 10, seat settings, sound settings, and/or navigational settings.

The vehicle battery state of charge sensor 72 can provide an output signal to the controller 50 regarding a state of charge of the vehicle battery system 26. In some embodiments, the output signal from the state of charge sensor 72 is indicative of a value of the state of charge of the vehicle battery system 26 (e.g., a percent charged value, a voltage of the vehicle battery system 26, etc.). In some embodiments, the output signal from the state of charge sensor 72 is indicative of the state of charge of the vehicle battery system 26 satisfying a predetermined threshold. In one example, the state of charge sensor 72 senses a voltage across the terminals of the vehicle battery system 26 and outputs a signal indicative of the voltage across the terminals. The output signal from the vehicle battery state of charge sensor 72 can be used by the controller 50 to control the supply of power to the cooling system 40 according to embodiments of the present disclosure.

The lift gate sensor 74 can provide an output signal to the controller 50 regarding an open/closed status of the lift gate 20. In some examples, the lift gate sensor 74 provides an output signal to the controller 50 when the lift gate 20 is moved between the closed and open positions. The controller 50 can use the output signal from the lift gate sensor 74 to control the supply of power to the cooling system 40 according to embodiments of the present disclosure. In one embodiment, the controller 50 may determine an elapsed period of time that the lift gate 20 has been in the open position and control the supply of power to the cooling system 40 based on the length of time the lift gate 20 has been in the open position.

The communication module 76 is in communication with the controller 50 for exchanging information with the controller 50. The communication module 76 can include wired and/or wireless network interfaces that enable communication with an external network (e.g., a cellular network, Wi-Fi network, etc.). The communication module 76 can also include suitable hardware (e.g., processors, memory, storage, antenna, etc.) and software to control the network interfaces. For example, the communication module 76 can include one or more communication controllers for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks, such as WiMAX (IEEE 802.16m), local area wireless networks (e.g., IEEE 802.11 a/b/g/n/ac or others), and/or Wireless Gigabit networks (e.g., IEEE 802.11ad). In this manner, the communication module 76 is configured to communicate with a remote user interface (e.g., mobile device, smart phone, smart watch, tablet, etc.) via the external network to allow the user to provide information to the controller 50 and/or receive information from the controller 50.

Figure 4:
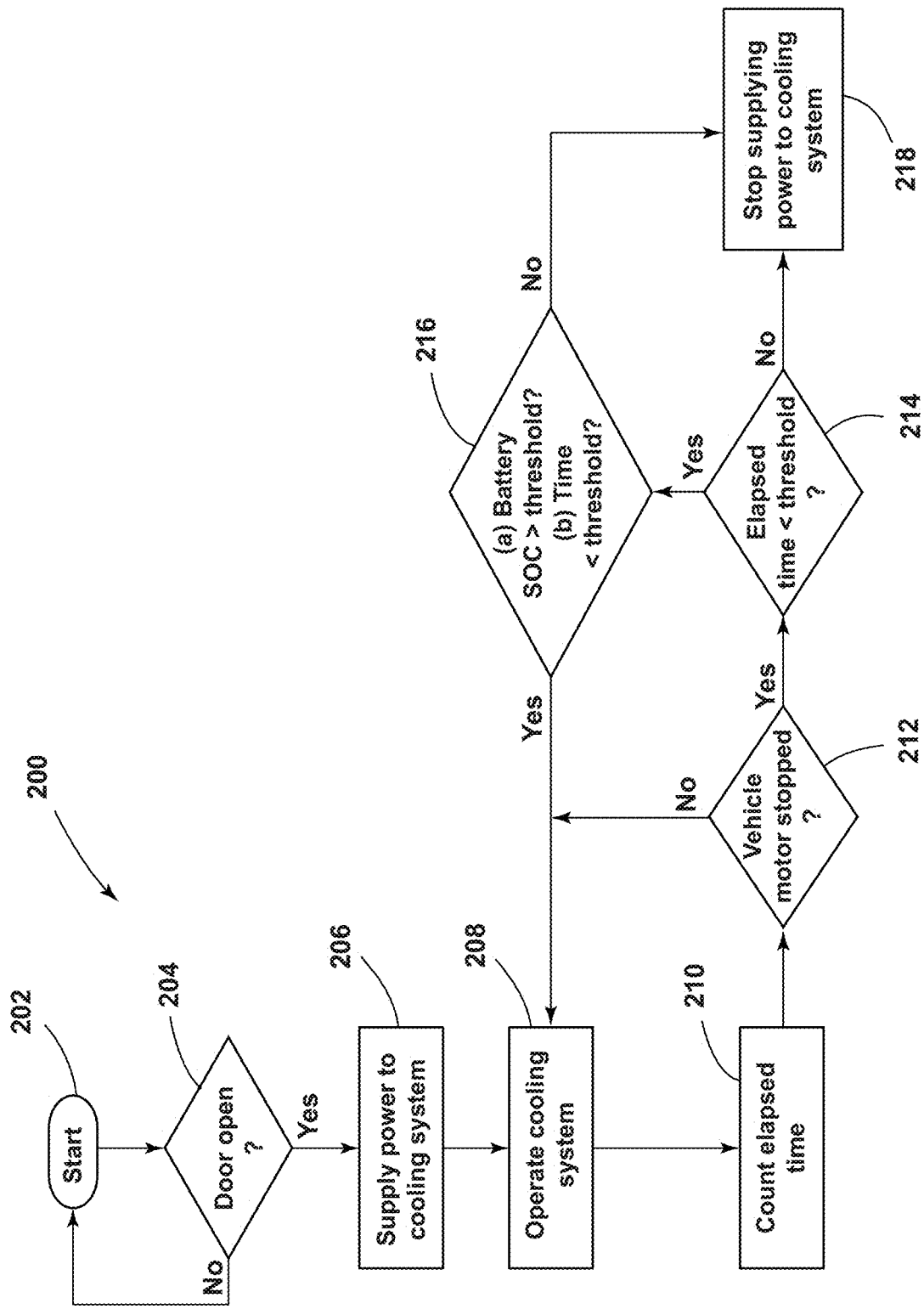
FIG. 4 is a flow chart illustrating a method of controlling a supply of power to a cooling system of a refrigerated compartment in a vehicle based on an output signal received from a door sensor associated with a door of the refrigerated compartment, according to aspects of the present disclosure.

FIG. 4 illustrates a method 200 for controlling the refrigerated compartment 30 according to an embodiment of the present disclosure. The method 200 for controlling the refrigerated compartment 30 can be used to control the supply of power to the refrigerated compartment 30 based on inferring a temperature of the contents within the chamber 34, rather than directly measuring the temperature of the contents using a temperature sensor. In this manner, the method 200 can be used to control the refrigerated compartment 30 in the absence of a dedicated temperature sensor and/or when it is desired to not utilize a temperature sensor (e.g., to save energy). The method 200 can be used to determine whether to continue to supply power to the cooling system 40 or to stop supplying power to the cooling system 40 when the vehicle motor 24 is stopped.

The method 200 can be implemented at step 202 at any time point after the vehicle motor 24 is started. At step 204, the method 200 determines if the door 38 of the refrigerated compartment 30 has been opened. In some embodiments, the method 200 determines that the door 38 has been opened based on an output signal received by the controller 50 from the door sensor 80. If the determination at step 204 is "No," the method 200 returns to step 202 at the start of the method 200. If the determination at step 204 is "Yes," the method 200 proceeds to step 206 to supply power to the cooling system 40. In some aspects, supplying power to the cooling system 40 may include controlling a drive relay or smart driver to supply current to power the cooling system 40. As long as power is supplied to the cooling system 40, the cooling system 40 continues to operate at step 208 to cool the chamber 34 until a predetermined temperature threshold is satisfied. In some embodiments, the predetermined temperature threshold may be a factory set default temperature or temperature range based on whether the refrigerated compartment 30 is intended to be utilized for cooling items or freezing items. For example, the predetermined temperature threshold may be similar to the default set-point temperature for a home refrigerator (e.g., about 35-40° F. (about 2-4° C.) to cool items or similar to the default set-point temperature for a home freezer (e.g., about 0° F. (about −18° C.)) to freeze items. In other embodiments, the predetermined temperature threshold may be based on information received from the sensor assembly 62 and/or one or more sensors 82-86 associated with the refrigerated compartment 30 and/or input received from the user. For example, the predetermined temperature threshold may be based on the user selecting a particular cooling mode (e.g., standard cooling mode, maximum cooling mode, etc.) through the HMI 68 or a dedicated user input feature associated with the refrigerated compartment 30. As long as power is supplied to the cooling system 40, the cooling system 40 will continue to operate to cool the chamber 34 until the predetermined temperature threshold is satisfied in a manner similar to that of a conventional household refrigerator or freezer. For example, the cooling system 40 can be a compressor-based cooling system that utilizes one or more thermistors to control the operation of cooling system 40 to cool the chamber 34 to a predetermined temperature.

The method 200 counts the elapsed time since the cooling system 40 has been drawing power at step 210. In one embodiment, the BCM 66 is coupled with the drive relay or smart driver that allows current to be drawn by the cooling system 40 from the vehicle battery system 26. The BCM 66 can provide an output signal to the controller 50 indicative of the current being drawn by the cooling system 40 and the output signal can be used to determine the elapsed time since the cooling system 40 has been drawing power at step 210. At step 212, the method 200 determines whether the vehicle motor 24 is stopped. If the method 200 determines that the vehicle motor 24 has not stopped, the cooling system 40 continues to operate at step 208. If the method 200 determines that the vehicle motor 24 has stopped at step 212 (e.g., the user has turned the vehicle 10 off), then the method proceeds to step 214 to determine whether the elapsed time determined at step 210 is less than a predetermined threshold value. If the elapsed time since the cooling system 40 has been drawing power is not less than the predetermined threshold value, then the supply of power to the cooling system 40 is stopped at 218. In some embodiments, the predetermined threshold value at step 214 is less than 40 minutes, less than 35 minutes, less than 30 minutes, less than 25 minutes, or less than 10 minutes. If the elapsed time counted at step 210 is less than the predetermined threshold value, then the method 200 proceeds to step 216. At step 216, the method 200 determines if: (a) the state of charge ("SOC") of the vehicle battery system 26 is greater than a predetermined threshold value and (b) the elapsed time since the vehicle motor 24 stopped at step 212 is less than a predetermined threshold. The vehicle battery state of charge can be determined at step 216 based on an output signal received by the controller 50 from the battery state of charge sensor 72. If the answer to both determinations (a) and (b) at step 216 is "Yes," then the method 200 returns to step 208 and the cooling system 40 continues to operate. If the answer to one or both of the determinations (a) and (b) at step 216 is "No," then the method proceeds to step 218 and the supply of power to the cooling system 40 is stopped.

The threshold values at steps 214 and 216 of the method 200 can be selected to provide a compromise between cooling the contents of the refrigerated compartment 30 as quickly as possible and not decreasing the state of charge of the vehicle battery system 26 to below a level at which the vehicle motor 24 might not be able to start. Without wishing to be limited by any theory, it is believed that for items commonly placed in the refrigerated compartment 30 (e.g., beverages, food, medicine), the exponential law of cooling suggests that the biggest change in temperature of an item placed in the chamber 34 occurs within about the first 30 minutes. Thus, the first 30 minutes of elapsed time after the door 38 is opened and an item is placed in the chamber 34 may have the largest impact on quickly cooling the item. For example, consider a scenario in which a user opens the door 38 of the refrigerated compartment 30 and places a beverage in the chamber 34. If the beverage was warm (e.g., room temperature), the cooling system 40 will need to run for a longer period of time to cool the beverage than if the beverage was already cooled. In the scenario in which the cooling system 40 is a compressor-based cooling system, it may take 12-24 hours to cool the beverage to a low temperature (e.g., 35-40° F. (about 2-4° C.)). If the beverage was already cold, the cooling system 40 may run for a short period of time or not at all. Thus, at step 214 the method 200 utilizes the elapsed time period that the cooling system 40 was drawing power since the door 38 was opened to infer the relative temperature of the items placed in the chamber 34. If the vehicle motor 24 is stopped (e.g., the user arrives at a gas station to fill the vehicle gas tank), and the elapsed time period determined at step 214 is less than a predetermined threshold, such as 30 minutes, it may be inferred that the items placed in the chamber 34 were not cool and that continuing to supply power to the cooling system 40 to cool the items will be beneficial. For example, if the elapsed time determined at step 214 is only 15 minutes, continuing to supply power to the cooling system 40 for an additional 10 minutes may have a significant impact on cooling the items in the chamber 34 to the desired temperature, and thus it may be beneficial to continue to supply power to the cooling system 40 in order to achieve the desired cooling of the beverage.

The determination of the vehicle battery SOC and time at step 216 prevents the cooling system 40 from continuing to draw power when the vehicle motor 24 is stopped for too long such that the vehicle battery system 26 is drained to a level at which the vehicle motor 24 may not be able to be re-started. In one aspect, as long as the vehicle battery system 26 remains above a predetermined voltage threshold (e.g., the state of charge is healthy), power can continue to be supplied to the cooling system 40 while the vehicle motor 24 is off. In one example, the battery state of charge threshold may be greater than 40% and the threshold for the elapsed time since the vehicle motor 24 has been stopped may be less than 10 minutes. The controller 50 can be provided with a look-up table or algorithm that changes one or both of the threshold values at step 216 based on the state of charge of the vehicle battery system 26. In some embodiments, the user may be able to disengage the time threshold used at step 216 through the HMI 68 in order to allow power to be supplied to the cooling system 40 as long as the battery state of charge remains above the predetermined threshold value, regardless of the elapsed time. This option may be useful in scenarios in which a perishable item, such as a medicine, is being stored in the refrigerated compartment 30.

Figure 5:
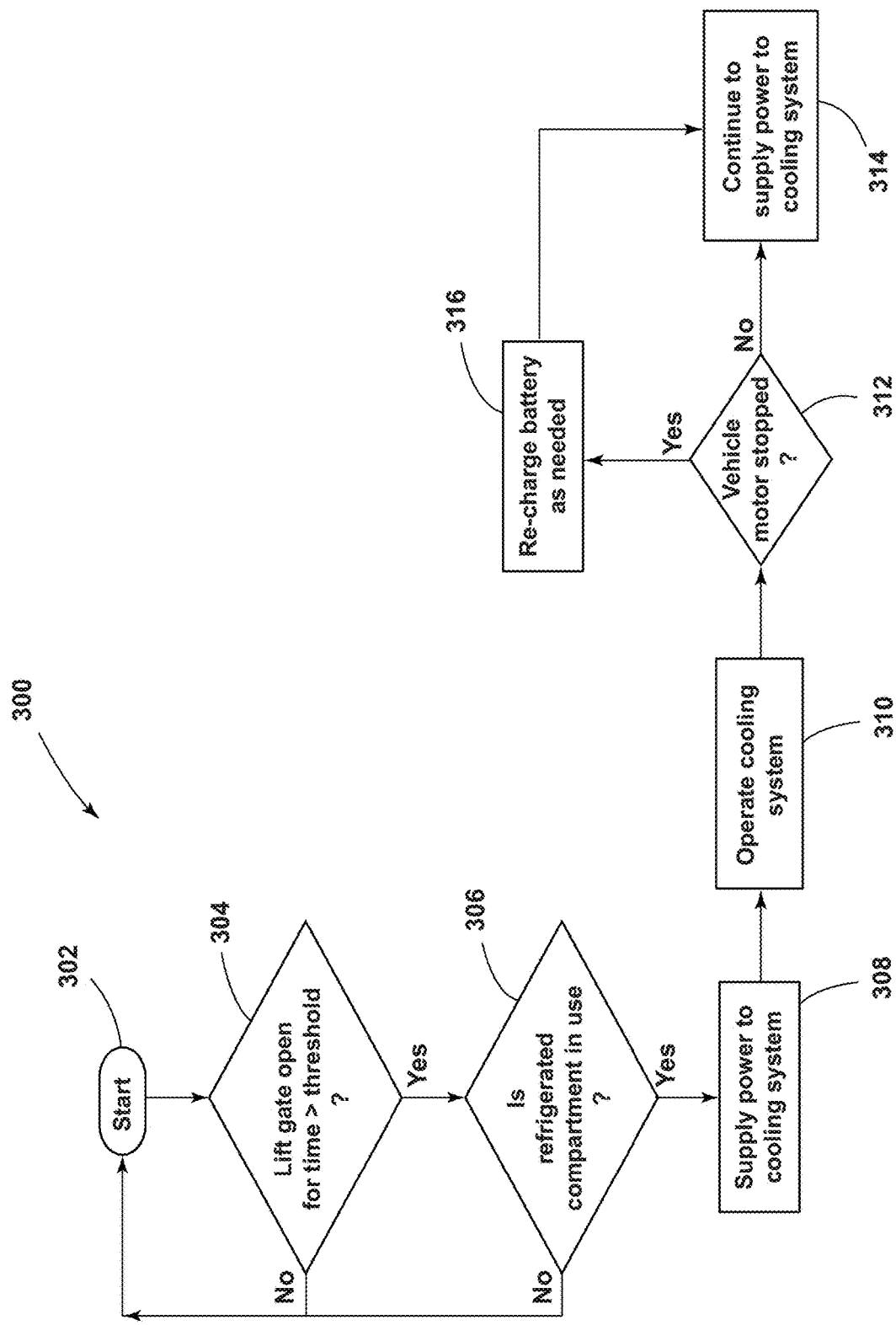
FIG. 5 is a flow chart illustrating a method of controlling a supply of power to a cooling system of a refrigerated compartment in a vehicle based on a status of a lift gate of the vehicle, according to aspects of the present disclosure.

FIG. 5 illustrates a method 300 for controlling the refrigerated compartment 30 according to an embodiment of the present disclosure. The method 300 generally relates to controlling the cooling system 40 of the refrigerated compartment 30 based at least in part on the status of the vehicle lift gate 20. The method 300 can be used alone or in combination with the method 200 of FIG. 4 to control the refrigerated compartment 30 according to embodiments of the present disclosure. In an exemplary implementation of the method 300, the method 300 supplies to power to the cooling system 40 based on the status of the lift gate 20, regardless of whether the vehicle motor 24 is on or off. For example, a user may wish to utilize the refrigerated compartment 30 when lounging or having a party near the vehicle (often referred to as "tailgating"), during which the lift gate 20 remains open. Typically, when users are lounging or gathering near the vehicle 10, it is desirable to not have the vehicle motor 24 continuously running. The method 300 allows for power to be supplied to the cooling system 40 regardless of whether the vehicle motor 24 is on or off without draining the vehicle battery system 26 to a level at which the vehicle motor 24 is likely to not be able to be started.

The method 300 can be implemented at step 302 at any time point after the vehicle motor 24 is started and/or after the lift gate 20 is opened. The controller 50 can determine that the lift gate 20 is open based on an output signal received from the lift gate sensor 74. The method 300 proceeds to step 304 to determine if the lift gate 20 has been opened for an elapsed time period greater than a predetermined time threshold. If the method 300 determines that the lift gate 20 is not open or that the lift gate 20 has not been open for an elapsed time greater than the time threshold, the method 300 returns to the start at 302. If the controller 50 determines that the lift gate 20 has been open for a time period greater than the time threshold, the method 300 proceeds to step 306 to determine if the refrigerated compartment 30 is in use. In one embodiment, the controller 50 can determine that the refrigerated compartment 30 is in use based on an output signal received from the door sensor 80 indicating that the door 38 of the refrigerated compartment 30 has been opened. In another embodiment, the controller 50 can determine that the refrigerated compartment 30 is in use based on input received from the user through the HMI 68, the communication module (e.g., input received from the remote user interface, such as a user's smart phone), and/or actuation of a dedicated refrigerated compartment on/off switch. In another embodiment, the controller 50 can determine that the refrigerated compartment 30 is in use based on an output signal received from one or more of the sensors 82, 84, 86 associated with the refrigerated compartment 30. For example, in embodiments in which the refrigerated compartment 30 includes the weight sensor 82, the controller 50 can determine that the refrigerated compartment 30 is in use based on an output signal received from the weight sensor 82 indicative of a weight value of the item(s) and/or indicative of the weight of the item(s) satisfying a predetermined weight threshold. In another example, in embodiments in which the refrigerated compartment 30 includes the temperatures sensor 84, the controller 50 can determine that item(s) are in the chamber 34 (and thus the refrigerated compartment 30 is in use) based on an output signal from the temperature sensor 84 indicative of the temperature of the item(s) in the chamber 34. In yet another example, in embodiments in which the refrigerated compartment 30 includes the proximity sensor 86, the controller 50 can determine that the refrigerated compartment 30 is in use based on an output signal from the proximity sensor 86 indicating that an item is present in the chamber 34. In some embodiments, the determination that the refrigerated compartment 30 is in use may be based on a combination of two or more of these examples.

If the method 300 determines that the refrigerated compartment 30 is in use, the method 300 proceeds to step 308 and supplies power to the cooling system 40. At step 310, the cooling system 40 is operated to cool the contents of the refrigerated compartment 30 in a manner similar to that described above with respect to step 208 of the method 200 of FIG. 4. The method 300 also includes a step 312 that determines if the vehicle motor 24 has been stopped. If the method 300 determines that the vehicle motor 24 has not been stopped, the method 300 proceeds to step 314 and power continues to be supplied to the cooling system 40. If the method 300 determines that the vehicle motor 24 has been stopped, then the method proceeds to step 316 where the vehicle motor 24 can be started as needed to maintain the battery charge above a pre-determined threshold sufficient to allow power to continue to be supplied to the cooling system 40 at step 314 without draining the vehicle battery system 26. The controller 50 can determine when the vehicle motor 24 needs to be started to re-charge the vehicle battery system 26 based on an output signal received from the battery state of charge sensor 72. In some embodiments, if the controller 50 determines that the voltage of the vehicle battery system 26 is greater than a predetermined voltage threshold, then the controller 50 continues to control the supply of power to the cooling system 40. However, if the controller 50 determines that the voltage of the vehicle battery system 26 is less than the predetermined voltage threshold, then the controller 50 can start the vehicle motor 24 to increase the voltage of the vehicle battery system 26 to voltage at or above the predetermined voltage threshold. For example, in a conventional combustion engine-based system, the controller 50 can activate the combustion engine and the alternator converts kinetic energy from the combustion engine into electrical energy that is directed to the vehicle battery system 26, which increases the voltage of the vehicle battery system 26. After the voltage of the vehicle battery system 26 has increased to a value at or above the voltage threshold, then the controller 50 can allow power to be supplied to the cooling system 40 and can deactivate the combustion engine. This process can be repeated as needed as long as part of the method 300 to continue to supply power to the cooling system 40 while the lift gate 20 remains open. Optionally, the method 300 can be stopped based on user input through the HMI 68 or a remote user interface (e.g., a user's smart phone).

Figure 6A:
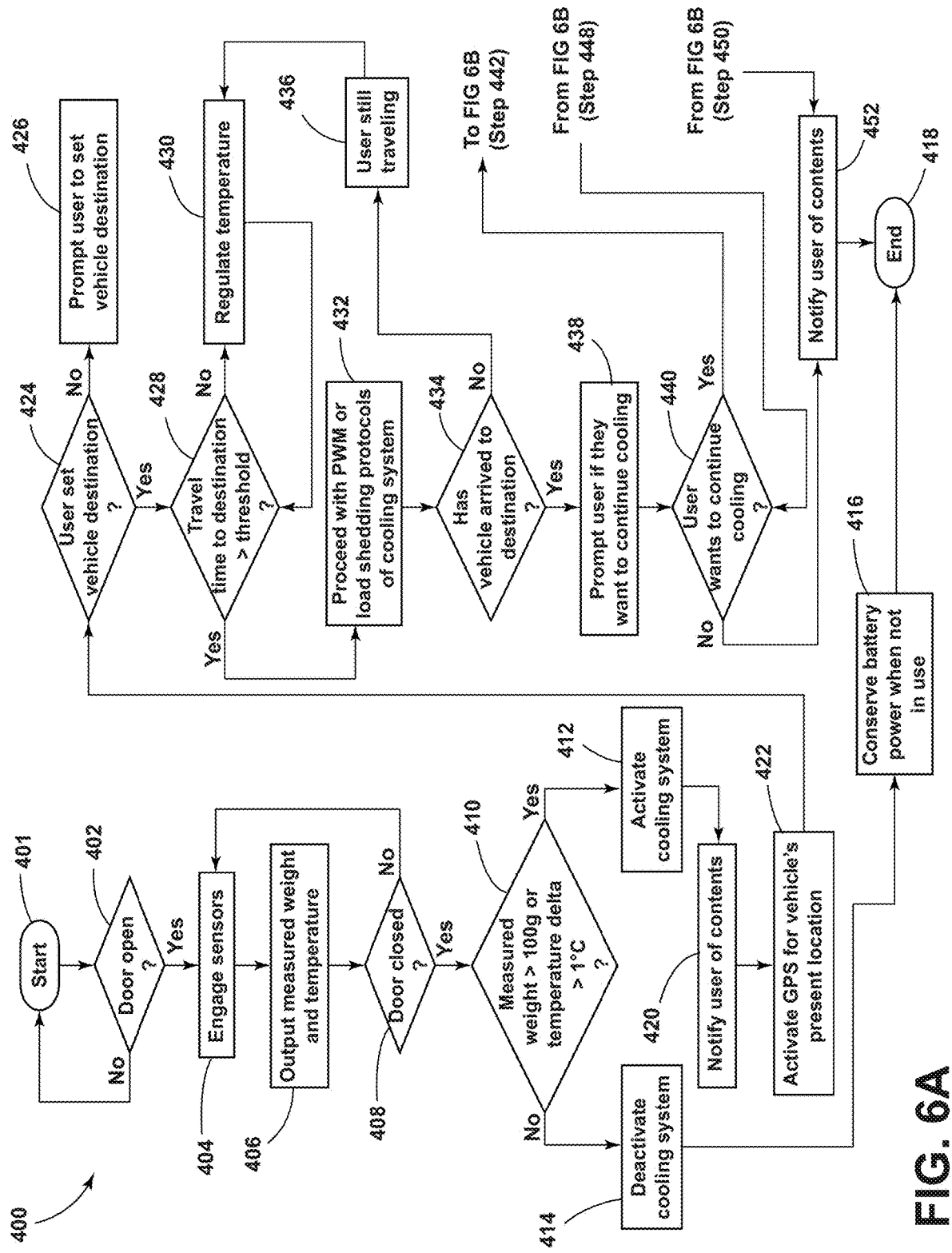
FIG. 6A is a flow chart illustrating a method of controlling a supply of power to a cooling system of a refrigerated compartment in a vehicle based on a geographical location of the vehicle, according to aspects of the present disclosure.
Figure 6B:
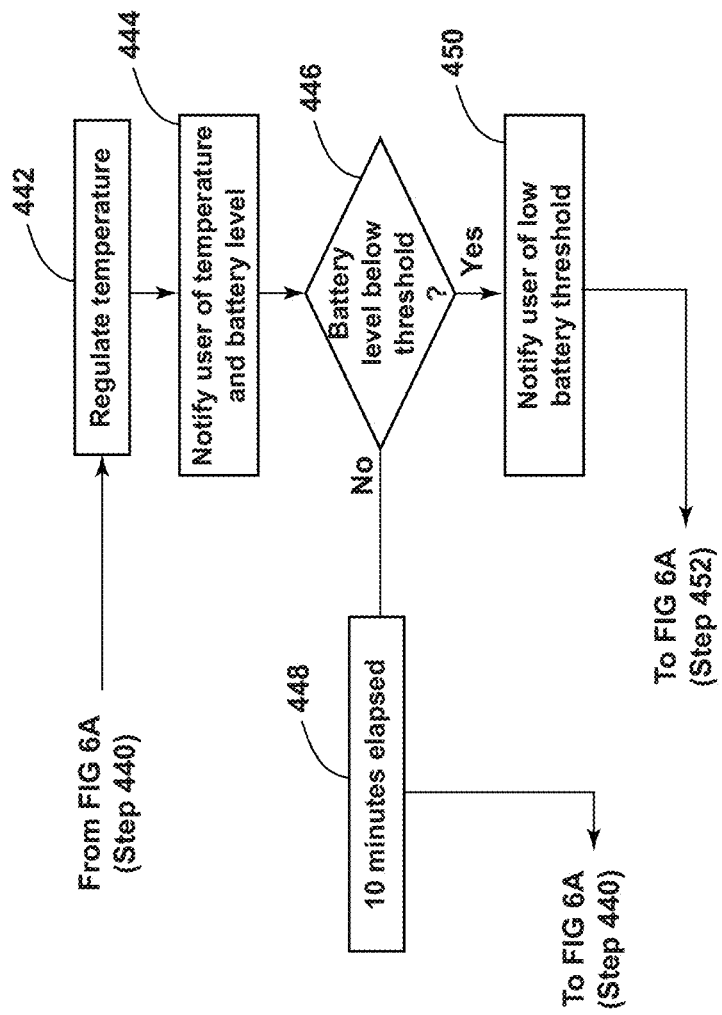
FIG. 6B is the flow chart of FIG. 6A continued for controlling a supply of power to a cooling system of a refrigerated compartment in a vehicle, according to aspects of the present disclosure.

FIGS. 6A-6B illustrate a method 400 for controlling the refrigerated compartment 30 according to an embodiment of the present disclosure. The method 400 can be used alone or in combination with one or both of the methods 200 and 300 described herein. The method 400 utilizes information regarding the geographical location of the vehicle 10, such as the current geographical location of the vehicle 10, the geographical location of the vehicle 10 relative to a destination (e.g., home), and/or the geographical location of the vehicle 10 along a route of a road trip, to control the supply of power to the cooling system 40 of the refrigerated compartment 30. For example, during a road trip, a user may desire to cool and keep cool items stored in the refrigerated compartment 30. During the road trip, the vehicle 10 may stop and the vehicle motor 24 may be turned off, such as for example when a user is filling the gas tank or stopping for food. However, in some scenarios it may be beneficial to continue to supply power to the cooling system 40 even when the vehicle motor 24 is off, such as when the vehicle 10 is far from the final trip destination. Alternatively, when the vehicle 10 is close to or at the final trip destination, it may be preferable to stop supplying power to the cooling system 40 when the vehicle motor 24 is turned off. The method 400 can be utilized in this exemplary scenario, and others, to control the supply of power to the cooling system 40 based at least in part on the geographical location of the vehicle 10. In some embodiments, the control of the supply of power to the cooling system 40 based at least in part on the geographical location of the vehicle 10 is based on an output signal received by the controller 50 from the navigation system 64.

The method 400 can be implemented at step 402 at any time point after the vehicle motor 24 is started. At step 404, the method 400 determines if the door 38 to the refrigerated compartment 30 is in the open position. For example, the controller 50 can determine if the door 38 is in the open or closed position based on the output signal received from the door sensor 80. If the controller 50 determines that the door 38 to the refrigerated compartment 30 is open, the weight sensor 82 and/or temperature sensor 84, if present, can be engaged at step 406. At step 408, the weight sensor 82 and/or temperature sensor 84 can output signals indicative of the weight of the item(s) and/or the temperature of the space within the chamber 34, respectively, to the controller 50. At step 410, the method 400 determines if the door 38 has been closed. If the door 38 has not been closed, the method 400 returns to step 406 to engage the weight sensor 82 and temperature 84 to update the weight and temperature readings, respectively. If the method 400 determines that the door 38 to the refrigerated compartment 30 is closed, the method 400 proceeds to step 410. At step 410, the method 400 determines if the weight of the items is above a predetermined weight threshold and/or a change in the temperature within the chamber 34 is greater than a predetermined temperature threshold based on the output signals from step 406. The thresholds at step 410 can be used to determine that at least one item needing cooling has been placed inside the chamber 34. For example, if the output signal from the weight sensor 82 indicates that the weight of the item placed within the chamber 34 is greater than 100 grams, the controller 50 can control the supply of power to the cooling system 40 to activate the cooling system 40 to cool the item(s) at step 412. If the output signal from the temperature sensor 84 indicates that the temperature within the chamber 34 has changed by more than 1° C., the method 400 can infer that an item to be cooled has been placed in the chamber 34 and the controller 50 can control the supply of power to the cooling system 40 at step 412. The weight threshold and temperature change threshold at step 410 can be adjusted upward or downward to adjust the sensitivity of the method 400 for determining when to activate the cooling system 40 at step 412. In some embodiments, one or both of the weight threshold and the temperature change threshold may need to be satisfied for the method 400 to proceed to step 412. If it is determined at step 410 that the weight and/or temperature thresholds have not been satisfied, then method 400 infers that there is not an item in the chamber 34 that needs cooling and proceeds to step 414 to stop the supply of power to the cooling system 40 to de-activate the cooling system 40. The method 400 can then proceed to step 416 to conserve battery power when the cooling system 40 is not in use and end the method at step 418.

Optionally, one or both of the weight sensor 82 and the temperature sensor 84 can be replaced with the proximity sensor 86. When the proximity sensor 86 is present, the method 400 can include outputting a signal indicative of the presence of an item within the chamber 34 at step 406 and making a determination to activate the cooling system 40 at steps 410 and 412 based on the output signal from the proximity sensor 86.

Following activation of the cooling system 40 at step 412, the user can be notified at step 420 that items have been placed in the refrigerated compartment 30. The notification to the user can include a notification of the presence of items within the chamber 34, the weight of the items, the temperature of the items, and/or a notification that the cooling system 40 has been activated. The notification may occur through the HMI 68, the remote user interface (e.g., smart phone), and/or a visual indicator associated with the refrigerated compartment 30 (e.g., illuminating a signal light or icon).

The method 400 includes a step 422 in which the Navigation System 64 is activated and provides an output signal to the controller 50 indicative of the geographic location of the vehicle 10. At step 424, the method 400 determines if the user has set a destination for the vehicle 10. The destination may be input through the HMI 68 and/or the remote user interface (e.g., smart phone). If the user has not set a destination, at step 426, the user may be prompted to set a destination through the HMI 68 and/or the remote user interface. At step 428, the method 400 determines if the vehicle 10 is within a predetermined distance from the final destination (e.g., determine if the travel time to the final destination is greater than a predetermined time threshold). If the vehicle 10 is not close to the final destination (e.g., the travel time to the final destination is greater than 10 minutes), the cooling system 40 can continue to operate at step 430 to cool the contents of the refrigerated compartment 30. If the travel time to the final destination is less than the predetermined time threshold, e.g., less than 10 minutes, then the method 400 can proceed to step 432, which can include implementing load shedding and/or power saving protocols. For example, at step 432 the power supply to the cooling system 40 may be stopped or decreased to save power.

The method 400 determines if the vehicle 10 has arrived at the final destination at step 434. If the vehicle 10 has not arrived at the final destination, then at step 436 the method determines that the user is still traveling and the method 400 returns to step 430 to continue to operate the cooling system 40 to cool the contents of the refrigerated compartment 30. If the vehicle 10 has arrived at the final destination, the method 400 can proceed to step 438 in which the user is prompted to indicate if the cooling system 40 should continue to operate to cool the items in the refrigerated compartment 30. At step 440, if the method 400 determines that the user wishes to continue to supply power to the cooling system 40, then the method proceeds to step 442 to operate the cooling system 40 to continue to cool the items within the refrigerated compartment 30. The method 400 can include an optional step 444 in which the method 400 may notify the user of the temperature within the cooling chamber 34 and/or the state of charge of the vehicle battery system 26 (e.g., based on the output signal from the battery state of charge sensor 72 received by the controller 50). The notification at step 444 may be made through the HMI 68 and/or the remote user interface. At step 446, the method 400 may determine the state of charge of the vehicle battery system 26 based on an output signal received from the battery state of charge sensor 72. If the battery state of charge is determined to be above a predetermined threshold at step 446, the method 400 can proceed to step 448. At step 448, after a predetermined period of time has elapsed since arriving at the final destination, for example 10 minutes, the method 400 can return to step 440 to determine if the user wishes to continue to supply power to the cooling system 40. If the battery state of charge is determined to be below the predetermined voltage threshold at step 446, the method 400 can proceed to step 450 and notify the user that the state of charge of the vehicle battery system 26 is less than the threshold. The notification may be used to prompt a user to turn off the supply of power to the cooling system 40 to avoid draining the vehicle battery system 26 and/or prompt a user to re-start the vehicle motor 24 to re-charge the vehicle battery system 26. Optionally, at step 450 the controller 50 can stop the supply of power to the cooling system 40 to avoid draining the vehicle battery system 26. The elapsed time at step 448 and the battery state of charge threshold at step 446 can be set to adjust the likelihood that the state of charge of the vehicle battery system 26 drops to a level at which it might not be possible to re-start the vehicle motor 24.

If the user indicates at step 440 that operation of the cooling system 40 is no longer desired, the method 400 can proceed to step 452 where the user is notified of the contents of the refrigerated compartment 30. Notifying the user at step 452 may include a notification of the presence of items within the chamber 34, the weight of the items, the temperature of the items, and/or a notification that the cooling system 40 has been de-activated. The method 400 can then proceed to step 418 to end the method 400.

Figure 7:
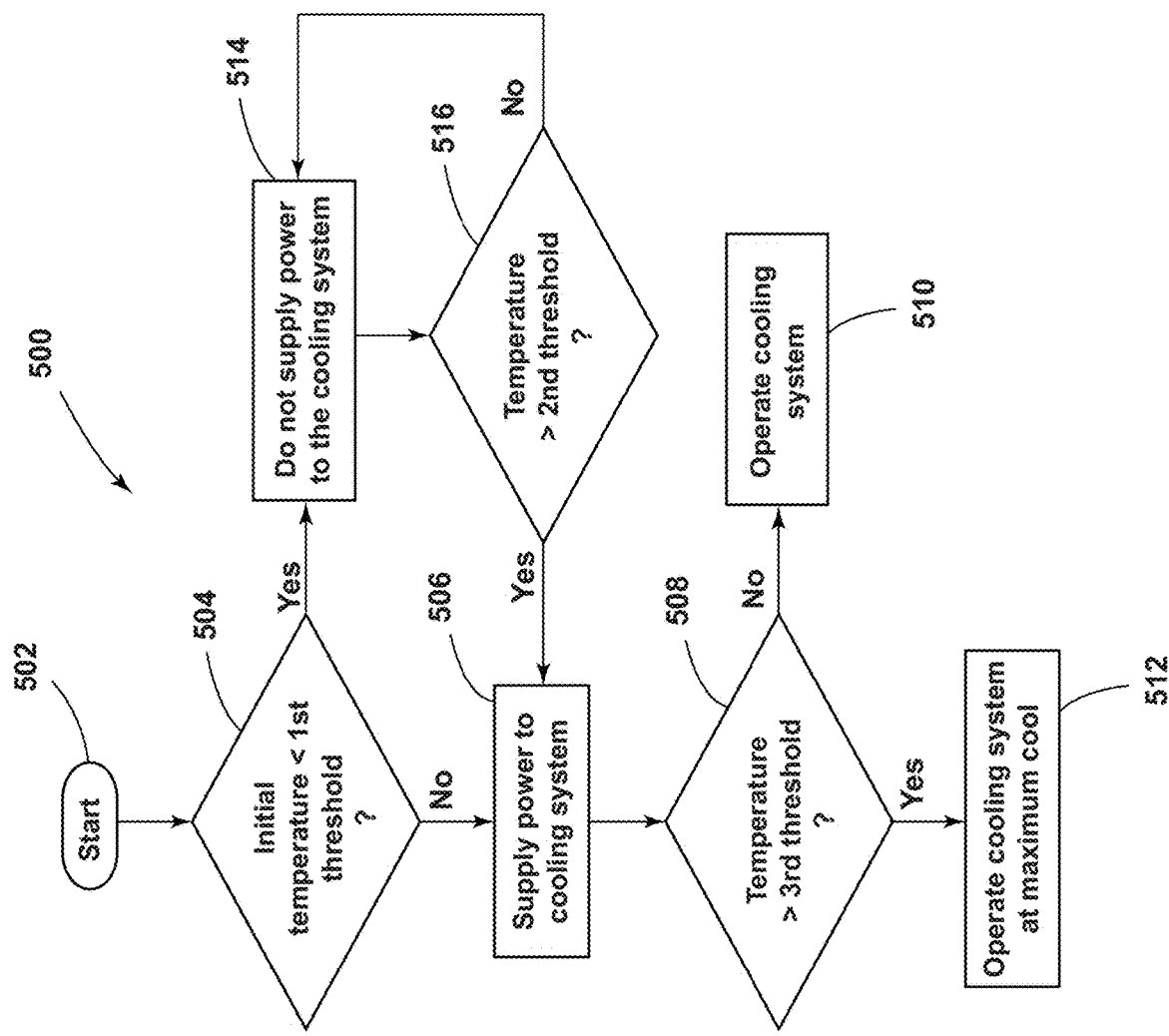
FIG. 7 is a flow chart illustrating a method of controlling a supply of power to a cooling system of a refrigerated compartment in a vehicle based on a temperature within an interior of the vehicle, according to aspects of the present disclosure.

FIG. 7 illustrates a method 500 for controlling the refrigerated compartment 30 according to an embodiment of the present disclosure. The method 500 can be used alone or in combination with any one or more of the methods 200, 300, and/or 400 described herein. The method 500 can be implemented at step 502 when the vehicle motor 24 is started. At step 504, the method 500 determines if the initial ambient temperature within the vehicle interior 12 is less than a first predetermined temperature threshold. If the initial ambient temperature within the vehicle interior 12 is greater than the first predetermined temperature threshold, then the method 500 proceeds to step 506 to supply power to the cooling system 40. At step 508, the method 500 determines if the temperature in the vehicle interior 12 is greater than a third predetermined temperature threshold. If the temperature of the vehicle interior 12 is not greater than the third predetermined temperature threshold, then the method proceeds to step 510 to operate the cooling system 40 to cool the contents of the refrigerated compartment 30. If the temperature of the vehicle interior 12 is greater than the third predetermined temperature threshold, then the method proceeds to step 512 to operate the cooling system 40 at a maximum cool setting. In other words, the third predetermined temperature threshold can be used by the controller 50 at step 508 to determine what level or setting the cooling system 40 should operate at. Alternatively, if the initial ambient temperature within the vehicle interior 12 determined at step 504 is less than the first predetermined temperature threshold, then the method 500 proceeds to step 514 and does not supply power to the cooling system 40. The method 500 then proceeds to determine if a subsequent temperature reading is greater than a second predetermined temperature threshold at step 516. If the subsequent temperature reading is greater than the second predetermined temperature threshold, then the method 500 proceeds to step 506 to supply power to the cooling system 40. If the subsequent temperature reading is less than the second predetermined temperature threshold, then the method 500 returns to step 514. In some embodiments, the vehicle sensor assembly 62 can include a temperature sensor that determines the interior ambient temperature of the interior 12 of the vehicle 10 and provides an output signal to the controller 50 based on the determined temperature. The controller 50 can use the output signal from the temperature sensor to implement the method 500.

Without wishing to be limited by any theory, the method 500 may be useful in situations in which a user enters the vehicle 10 after the vehicle 10 has been sitting, with the vehicle motor 24 off, for a period of time (e.g., overnight), and the exterior environment temperatures are low. In this scenario, depending on the exterior temperature and the length of time the vehicle 10 has been sitting, the temperature inside the vehicle interior 12, and thus inside the refrigerated compartment 30, may be low enough that there is no need to waste energy powering up the electronics to operate the refrigerated compartment 30. Thus, in some scenarios, the method 500 may provide a power-saving feature. For example, if the temperature in the vehicle interior 12 is less than a cooling temperature, for example 40° F. (about 4° C.), the method 500 may infer that the temperature inside the refrigerated compartment 30 is also less than 40° F. (about 4° C.), and thus there is no need to supply power to the cooling system 40 of the refrigerated compartment. However, as the temperature in the vehicle interior 12 increases, it may be assumed that the temperature within the refrigerated compartment 30 also increases, and thus when the temperature within the vehicle interior 12 subsequently increases above a predetermined temperature, power can be supplied to the cooling system 40. In one exemplary embodiment, the first predetermined temperature threshold may be 40° F. (about 4° C.) and the second predetermined temperature threshold may be 60° F. (about 16° C.). In addition, when the ambient temperature within the vehicle interior 12 is high, it may be assumed that the vehicle occupants are more likely to want a cool drink and thus it may be advantageous to operate the cooling system 40 at a maximum cool setting. For example, the third temperature threshold may be a higher temperature, such as 77° F. (about 25° C.), which corresponds to an ambient temperature at which vehicle occupants may be more likely to want a cool drink. Operating the cooling system 40 at a maximum cool setting may allow the contents to cool quicker and/or remain cool for longer when power to the cooling system 40 is stopped (e.g., when the vehicle motor 24 is stopped). Without wishing to be limited by any theory, it is believed that due to the exponential law of cooling, it is unlikely that the contents of the refrigerated compartment 30 (such as drinks) will freeze within a few hours. In some embodiments, a time limit for the maximum cool setting can be set for a predetermined period of time (e.g., 4 hours), which may optionally be adjusted or canceled by the occupants of the vehicle 10 through the HMI 68 and/or the remote user interface.

FIG. 8 illustrates a method 600 for controlling the refrigerated compartment 30 according to an embodiment of the present disclosure. The method 600 can be used alone or in combination with any one or more of the methods 200, 300, 400 and/or 500 described herein. The method 600 can be implemented at step 602 when the vehicle motor 24 is started. At step 604, the method 600 can determine if the body temperature of one or more occupants is above a predetermined temperature threshold. If the body temperature of one or more occupants is not above the predetermined temperature threshold, the method 600 returns to step 602. If the body temperature of one or more occupants is above the predetermined temperature threshold, the method 600 proceeds to step 608 to operate the cooling system at a maximum cool setting. In some embodiments, the vehicle sensor assembly 62 can include a temperature sensor that determines the body temperature of one or more occupants of the vehicle 10 and provides an output signal to the controller 50 based on the determined temperature. The controller 50 can use the output signal from the temperature sensor to implement the method 600. Without wishing to be limited by any theory, the method 600 may be based on the assumption that as the body temperature of the occupants rises, the likelihood that the occupants will desire a cool beverage or food item increases from the refrigerated compartment 30. The cooling system 40 can be operated at a maximum cool setting to increase the rate at which items are cooled and/or to facilitate maintaining the cool temperature of the items when the vehicle motor 24 is stopped (and the power supply to the cooling system 40 is also stopped). The method 600 may be implemented using one or more infrared cameras, for example, that may obtain the body temperature of one or more occupants. In some examples, the method 600 may be based solely on the body temperature of the driver or one or more passengers in the vehicle 10. In some examples, the method 600 may be based on a predetermined number of occupants having a body temperature above a predetermined temperature threshold.

For example, the sensor assembly 62 can include one or more temperature sensors that can determine a body temperature of one or more occupants of the vehicle, such as an infrared camera, for example. In this example, the sensor assembly 62 may provide an output signal to the controller 50 indicative of a value of a body temperature of one or more occupants or indicative of a body temperature of one or more occupants satisfying a predetermined threshold. The controller 50 may use the output signal relating to occupant body temperature to control the refrigerated compartment 30 and/or additional systems of the vehicle 10 (e.g., the vehicle HVAC system). For example, if the output signal from the sensor assembly 62 indicates that the body temperature of one or more occupants is above a predetermined threshold, the controller 50 may actuate the cooling system 40 to a maximum cool setting. In some embodiments, a time limit for the maximum cool setting can be set for a predetermined period of time (e.g., 4 hours), which may optionally be adjusted or canceled by the occupants of the vehicle 10 through the HMI 68 and/or the remote user interface.

According to various examples, a vehicle includes a vehicle motor, a vehicle battery system, a refrigerated compartment comprising a chamber having an access opening, a door coupled with the refrigerated compartment and moveable between open and closed positions relative to the access opening, a cooling system fluidly coupled with the chamber, and a controller that controls a supply of power from the vehicle battery system to the cooling system based on at least one output signal received from a vehicle component. Embodiments of the present disclosure may include one or a combination of the following features:

the vehicle component comprises a navigation system of the vehicle;

a lift gate, and a lift gate, wherein the vehicle component comprises a sensor that provides an output signal indicative of an open or closed status of the lift gate, and wherein the controller controls the supply of power from the vehicle battery system to the cooling system based on the output signal from the sensor;

the vehicle component comprises a sensor that provides an output signal indicative of a charge status of the vehicle battery system, and wherein the controller controls the supply of power from the vehicle battery system to the cooling system based on the output signal from the sensor;

the vehicle component comprises at least one temperature sensor one of detects a body temperature of an occupant of the vehicle, detects a temperature of a passenger compartment of the vehicle, or both, and wherein the controller controls the supply of power from the vehicle battery system to the cooling system based on an output signal from the temperature sensor;

the vehicle component comprises an electrical component that provides an output signal indicative of a power consumption of the cooling system, and wherein the controller controls the supply of power from the vehicle battery system to the cooling system based on the output signal from the electrical component; and a weight sensor associated with the chamber that provides an output signal indicative of a weight of an item placed within the chamber, and wherein the controller controls a supply of power to the cooling system based on the output signal from the weight sensor.

According to yet another example, a vehicle includes a vehicle motor, a vehicle battery system, a refrigerated compartment comprising a chamber having an access opening, a door coupled with the refrigerated compartment and moveable between open and closed positions relative to the access opening, a door sensor that provides an output signal when the door is moved between the open and closed positions, a cooling system fluidly coupled with the chamber, and a controller communicably coupled with the door sensor, wherein the controller controls a supply of power from the vehicle battery system to the cooling system based on the output signal received from the door sensor. Embodiments of the present disclosure may include one or a combination of the following features:

the controller controls a supply of power from the vehicle battery system to the cooling system based on a length of time the cooling system draws power from the vehicle battery system subsequent to receiving the output signal from the door sensor;

a vehicle battery sensor that provides an output signal indicative of a state of charge of the vehicle battery system, and wherein the controller controls a supply of power from the vehicle battery system to the cooling system based on the output signal received from the vehicle battery sensor;

the cooling system comprises a compressor, and wherein the controller controls a supply of power from the vehicle battery system to the cooling system based on a length of time the compressor is operating;

the controller maintains the supply of power to the cooling system when the vehicle motor is stopped when the following condition is satisfied: the cooling system has been operating for a time period less than a first threshold value; and the controller maintains the supply of power to the cooling system when the vehicle motor is stopped when the following conditions are satisfied: a state of charge of the vehicle battery system is above a second threshold value, and an elapsed time period since the vehicle motor was stopped is less than a third threshold value.

According to another example, a method of controlling a refrigerated compartment in a vehicle includes supplying power from a vehicle battery system of the vehicle to a cooling system of the refrigerated compartment, cooling a chamber of the refrigerated compartment with the cooling system, receiving, by a controller of the vehicle, at least one output signal from at least one vehicle component, and controlling the supply of power from the vehicle battery system to the cooling system based on the at least one output signal received by the controller from the at least one vehicle component. Embodiments of the present disclosure may include one or a combination of the following features:

the receiving, by a controller of the vehicle, at least one output signal comprises receiving an output signal by the controller indicative of an elapsed time period that the cooling system has been operating since a door of the storage chamber was moved between open and closed positions;

the controlling the supply of power comprises continuing to supply power to the cooling system when a motor of the vehicle is stopped when at least one of the following conditions are satisfied: the elapsed time period that the cooling system has been operating since the door was moved between open and closed positions is less than a first threshold value, a state of charge of the vehicle battery system is above a second threshold value, and an elapsed time period since the vehicle motor was stopped is less than a third threshold value;

wherein the receiving, by a controller of the vehicle, at least one output signal comprises receiving an output signal indicative of a lift gate of the vehicle being in an open position;

the receiving, by a controller of the vehicle, at least one output signal comprises receiving an output signal indicative of a geographical location of the vehicle;

receiving an input from a user regarding a destination of the vehicle, and wherein the receiving, by a controller of the vehicle, at least one output signal comprises receiving an output signal indicative of a distance of the vehicle from the destination; and determining a temperature of at least one occupant of the vehicle, and wherein the receiving, by a controller of the vehicle, at least one output signal comprises receiving an output signal indicative of a temperature of at least one occupant of the vehicle.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
   a vehicle motor;
   a vehicle battery system;
   a refrigerated compartment comprising a chamber having an access opening;
   a door coupled with the refrigerated compartment and moveable between open and closed positions relative to the access opening;
   a weight sensor associated with the chamber that provides an output signal indicative of a weight of an item placed within the chamber;
   a powered cooling system fluidly coupled with the chamber; and
   a controller that controls a supply of power from the vehicle battery system to the cooling system based on at least one output signal received from a vehicle component, and wherein the controller further controls the supply of power to the cooling system based on the output signal from the weight sensor.

2. The vehicle of claim 1, wherein the vehicle component comprises a navigation system of the vehicle that provides location and/or drive route information.

3. The vehicle of claim 1, further comprising:
   a lift gate, and
   wherein the vehicle component comprises a sensor that provides an output signal indicative of an open or closed status of the lift gate, and
   wherein the controller controls the supply of power from the vehicle battery system to the cooling system based on the output signal from the sensor.

4. The vehicle of claim 1, wherein the vehicle component comprises a sensor that provides an output signal indicative of a charge status of the vehicle battery system, and
   wherein the controller controls the supply of power from the vehicle battery system to the cooling system based on the output signal from the sensor.

5. The vehicle of claim 1, wherein the vehicle component comprises at least one temperature sensor one of detects a body temperature of an occupant of the vehicle, detects a temperature of a passenger compartment of the vehicle, or both, and
   wherein the controller controls the supply of power from the vehicle battery system to the cooling system based on an output signal from the temperature sensor.

6. The vehicle of claim 1, wherein the vehicle component comprises an electrical component that provides an output signal indicative of a power consumption of the cooling system, and wherein the controller controls the supply of power from the vehicle battery system to the cooling system based on the output signal from the electrical component.

7. A vehicle, comprising:
a vehicle motor;
a vehicle battery system;
a refrigerated compartment comprising a chamber having an access opening;
a door coupled with the refrigerated compartment and moveable between open and closed positions relative to the access opening;
a door sensor that provides an output signal when the door is moved between the open and closed positions;
a weight sensor associated with the chamber that provides an output signal indicative of a weight of an item placed within the chamber;
a powered cooling system fluidly coupled with the chamber; and
a controller communicably coupled with the door sensor, wherein the controller controls a supply of power from the vehicle battery system to the cooling system based on the output signal received from the door sensor, and wherein the controller further controls the supply of power to the cooling system based on the output signal from the weight sensor.

8. The vehicle of claim 7, wherein the controller controls a supply of power from the vehicle battery system to the cooling system based on a length of time the cooling system draws power from the vehicle battery system subsequent to receiving the output signal from the door sensor.

9. The vehicle of claim 7, further comprising:
a vehicle battery sensor that provides an output signal indicative of a state of charge of the vehicle battery system, and
wherein the controller controls a supply of power from the vehicle battery system to the cooling system based on the output signal received from the vehicle battery sensor.

10. The vehicle of claim 7, wherein the cooling system comprises a compressor, and wherein the controller controls a supply of power from the vehicle battery system to the cooling system based on a length of time the compressor is operating.

11. The vehicle of claim 7, wherein the controller maintains the supply of power to the cooling system when the vehicle motor is stopped when the following condition is satisfied:
the cooling system has been operating for a time period less than a first threshold value.

12. The vehicle of claim 11, further wherein the controller maintains the supply of power to the cooling system when the vehicle motor is stopped when the following conditions are satisfied:
a state of charge of the vehicle battery system is above a second threshold value; and
an elapsed time period since the vehicle motor was stopped is less than a third threshold value.

13. A method of controlling a refrigerated compartment in a vehicle, the method comprising:
supplying power from a vehicle battery system of the vehicle to a powered cooling system of the refrigerated compartment;
cooling a chamber of the refrigerated compartment with the cooling system;
measuring a weight of an item placed within the chamber with a weight sensor that generates an output signal indicative of the weight;
receiving, by a controller of the vehicle, at least one output signal from at least one vehicle component; and
controlling the supply of power from the vehicle battery system to the cooling system based on the at least one output signal received by the controller from the at least one vehicle component, and further based on the output signal form the weight signal.

14. The method of claim 13, wherein the receiving, by a controller of the vehicle, at least one output signal comprises receiving an output signal by the controller indicative of an elapsed time period that the cooling system has been operating since a door of the storage chamber was moved between open and closed positions.

15. The method of claim 14, wherein the controlling the supply of power comprises continuing to supply power to the cooling system when a motor of the vehicle is stopped when at least one of the following conditions are satisfied:
the elapsed time period that the cooling system has been operating since the door was moved between open and closed positions is less than a first threshold value;
a state of charge of the vehicle battery system is above a second threshold value; and
an elapsed time period since the vehicle motor was stopped is less than a third threshold value.

16. The method of claim 13, wherein the receiving, by a controller of the vehicle, at least one output signal comprises receiving an output signal indicative of a lift gate of the vehicle being in an open position.

17. The method of claim 13, wherein the receiving, by a controller of the vehicle, at least one output signal comprises receiving an output signal indicative of a geographical location of the vehicle.

18. The method of claim 13, further comprising:
receiving an input from a user regarding a destination of the vehicle, and
wherein the receiving, by a controller of the vehicle, at least one output signal comprises receiving an output signal indicative of a distance of the vehicle from the destination.

19. The method of claim 13, further comprising:
determining a temperature of at least one occupant of the vehicle, and
wherein the receiving, by a controller of the vehicle, at least one output signal comprises receiving an output signal indicative of a temperature of at least one occupant of the vehicle.

* * * * *